Figure 5:
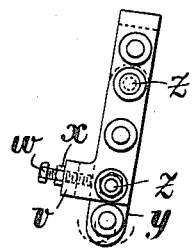

A. H. DARKER.
SUSPENSION DEVICE FOR DYNAMO ELECTRIC MACHINES.
APPLICATION FILED MAR. 30, 1912.
1,045,818.
Patented Dec. 3, 1912.
2 SHEETS—SHEET 1.
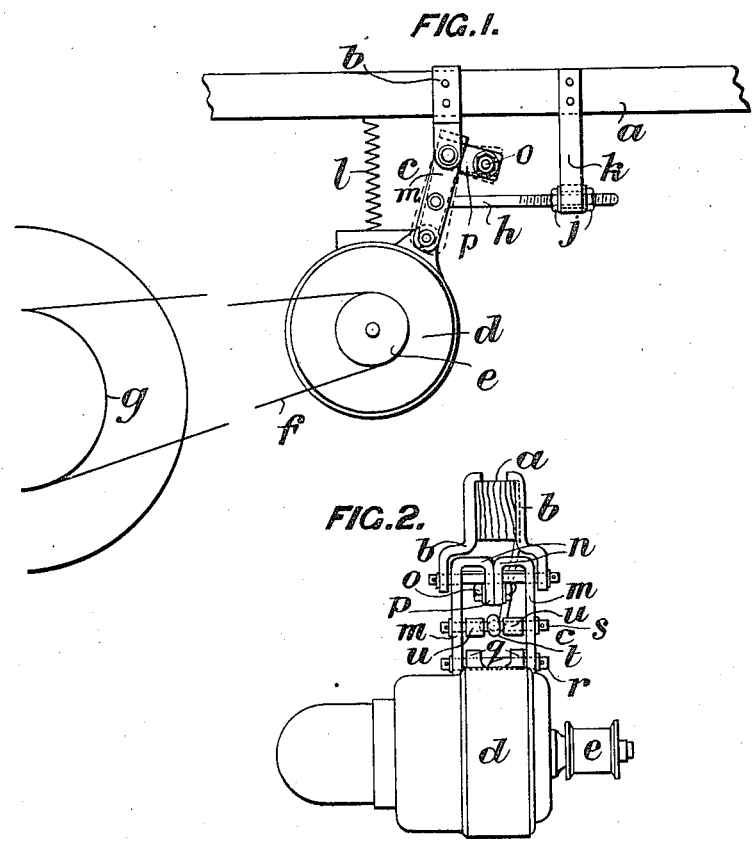
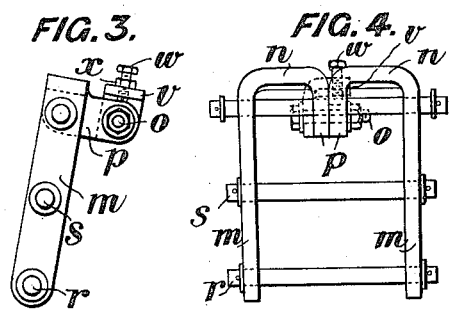

UNITED STATES PATENT OFFICE.

ALFRED HENRY DARKER, OF BLACKHEATH, ENGLAND, ASSIGNOR TO J. STONE & COMPANY LIMITED, OF DEPTFORD, ENGLAND.

SUSPENSION DEVICE FOR DYNAMO-ELECTRIC MACHINES.

1,045,818. Specification of Letters Patent. Patented Dec. 3, 1912.

Application filed March 30, 1912. Serial No. 687,424.

*To all whom it may concern:*

Be it known that I, ALFRED HENRY DARKER, a subject of the King of Great Britain, residing at Heath View, Montpelier Row, Blackheath, in the county of Kent, England, have invented new and useful Improvements in Suspension Devices for Dynamo-Electric Machines, of which the following is a specification.

This invention relates to improvements in suspension devices for dynamo electric machines and particularly concerns suspension links employed for suspending dynamo-electric machines from railway vehicles and other rolling stock. Links have heretofore been pivotally suspended from the framing of the vehicles and have been pivotally connected with the dynamo toward one side of the vertical diameter of such dynamo, that is to say not in vertical alinement with the axis of the armature shaft and the angularity of such link in relation to the plane of the vehicle framing has been preserved and adjusted when required by a screw-threaded rod pivotally connected at one end with the link and secured at the other end to a fixed bracket or arm by means of nuts.

Now inasmuch as the pull of the belt comes upon one end only of the armature shaft of a dynamo suspended by such a link, there is a tendency for the axis of the armature shaft to shift out of parallelism with the coach axle from which it is driven. Such shifting may also be due to other causes. With suspension links as heretofore constructed it has been usual when the aforesaid parallelism has been lost, to dismount the dynamo, remove the link and to operate upon the latter at the forge to give the link a set in the required direction, that is to say to alter the relation of one suspensory leg of the loop to the other leg.

Now according to the present invention a link or link device comprises two portions adjustable in relation to one another, which will enable the parallelism aforesaid to be readily regained, the device being so constructed or arranged that the relative position of one link leg to the other may be adjusted by suitable adjusting means without dismounting the dynamo and removing the link as heretofore was found necessary.

This invention is not concerned with arrangements in which a dynamo is supported upon a pair of cross bars the ends of which are suspended by links from respective stirrups slidably mounted on side supporting bars.

In order to enable the invention to be readily understood reference is made to the accompanying drawings in which:—

Figure 1 is an end elevation showing a dynamo suspended by an improved suspension link. Fig. 2 is a side elevation of the link and dynamo seen in Fig. 1 the car framing member being seen in cross section. Figs. 3, 5, 7 and 9 are end elevations and Figs. 4, 6, 8 and 10 are side elevations corresponding with respective end elevations of various modifications.

In Fig. 1 $a$ is the car framing on which are fixed brackets $b$ for pivotally supporting the link $c$ which suspends the dynamo $d$. The dynamo pulley $e$ is driven by a belt $f$ from a pulley $g$ on a car axle and the screw-threaded rod $h$ pivotally connected with the link $c$ and adjustable by nuts $j$ in the bracket $k$ is employed for adjusting the tension on the belt. A shock absorbing spring $l$ may be connected between the car framing $a$ and the dynamo.

The parts described so far are those usually employed for the purpose and the invention, as stated, refers to the link $c$ one portion of which is adjustable in relation to the other so that when the dynamo spindle loses parallelism with the car axle an adjustment of the link may be made which will restore such parallelism. The link is suitably made in two portions, see Fig. 2, each of which comprises one suspension leg $m$ and, say, one half of the top cross piece, or lateral member $n$, so that each portion may be of substantially inverted L-shape as shown. The two portions of the link are for example fastened together by a bolt $o$ extending through bolt holes formed in lugs $p$ or projections made integrally with the portions of the top cross piece $n$, the diameters of the bolt holes in one or in both of the lugs being larger than the diameter of the bolt $o$, or being otherwise formed so that by loosening the nut of the bolt $o$, the parts $n$ and legs $m$ may be moved slightly in relation to one another in order to obtain the desired adjustment, after which the nut is tightened again and the parts are thereby clamped in the new position. Curved slots or other convenient apertures may be formed in the lugs $p$ in place of enlarged bolt holes, and the lugs or projecting parts p may extend in the direction of the bracket k as shown. The lower ends of the suspension legs m are connected as usual to lugs q on the dynamo by a pivot pin r passing through holes in such ends and in the lugs q, and a pin s is passed through the legs m nearly half way from the lower ends and through an eye t on the end of the screw threaded rod h in order to provide the pivotal connection between the said rod h and the suspension link. Spacing or distance sleeves u may be provided on the pin s for keeping the eye t in position. If the dynamo axle loses parallelism the nut on the short bolt o is loosened and one of the lugs p is knocked up or down, according to the adjustment required and consequently the lower end of the corresponding leg m will move in relation to the lower end of the other leg m, as shown by the dotted lines in Fig. 1, thereby sluing the dynamo and correctly positioning the spindle thereof. Moreover, as the legs m of the link are of greater length than the projections or lugs p aforesaid, it follows that a small relative movement of a lug p produces a greater amount of relative movement between the lower ends of the legs and the latter being arranged at a short distance apart compared with the length of the dynamo spindle, a small amount of relative movement of a leg m represents an appreciable amount of sluing of the armature spindle.

Figs. 3 and 4 show to a larger scale a suspension link very similar to that seen in Figs. 1 and 2 but in this modification one of the lugs p is formed with a bent extended portion or arm v taking over the other lug p. A screw w works in a screw threaded hole in the arm v and presses against the other lug p and normally acts as a stop to prevent relative movement between the lugs p and therefore between the limbs m under the stress of the one-sized belt drive. Upon loosening the nut of the bolt o and screwing down the screw w the limbs m will be moved relatively with one another. If the screw w be unscrewed a little this will allow the two limbs m to be moved in relation to one another. After any adjustment of the screw w the parts are secured in the adjusted position by tightening the nut of the bolt o and by tightening the lock nut x on the screw w.

Figure 6:
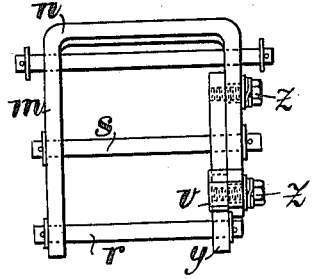

In Figs. 5 and 6 the division of the link into two relatively movable parts is accomplished by forming one of the limbs m of two parts. For example the part y is held to the right hand limb by means of bolts z passing through enlarged holes or slots in the limb and screwing into screw threaded holes in the limb. A bent arm or lug v is formed on the limb and an adjusting screw w works therein and presses against the part y. It will be obvious that by loosening the bolts z and adjusting the screw w the part y may be adjusted in relation to the limb, the part y turning about the pin s as center. As the suspension pin r is supported at one end in the part y and at the other end in the opposite limb m the desired sluing of the dynamo spindle will be produced by such adjustment.

Figure 7:
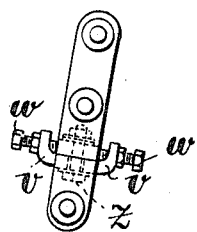
Figure 8:
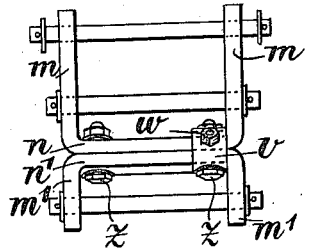

According to the modification seen in Figs. 7 and 8 the link is divided in a line parallel with the dynamo spindle. Each link portion comprises limbs m or $m^1$ and lateral parts n or $n^1$. The link portions are secured together by bolts z which pass through enlarged bolt holes in the part $n^1$ and through bolt holes of the proper size in the part n, nuts being shown upon the upper ends of the bolts z for tightly securing the parts n $n^1$ together. The part $n^1$ is formed with a bent arm v on the front and toward one side, and with a second arm v on the rear and toward the other side. By loosening the bolts z and adjusting one or the other of the screws w screwing through the arms v and pressing against the part n the link portion $n^1$ $n^1$ can be adjusted upon the upper link portion so as to slue the dynamo spindle as desired.

Figure 10:
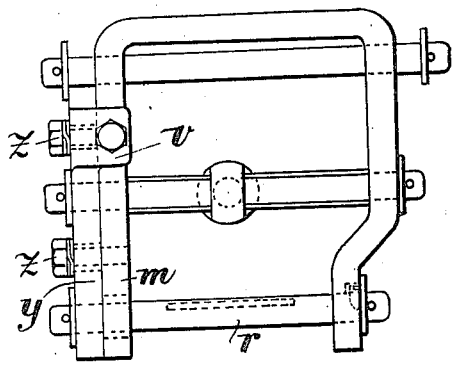
Figure 9:
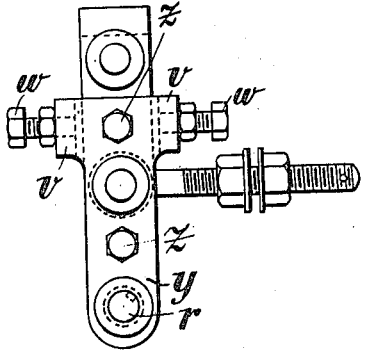

The arrangement illustrated by Figs. 9 and 10 is similar to that seen in Figs. 5 and 6. In the modification in Figs. 9 and 10 however there are two bent arms v one to the front and one to the rear of the limb portion y, and such arms are placed at the upper end of the limb portion instead of at the lower end as in Figs. 5 and 6. Moreover the limb proper m to which the portion y is connected is shown extending below the suspension pin r and is formed with an enlarged hole or slot seen in dotted lines in Figs. 9 and 10 for the pin r to pass through. It will now be readily understood that after loosening the bolts z the set screws w may be adjusted in one direction or the other for the purpose of moving the part y in relation to the adjacent limb m thereby sluing the pin r and dynamo spindle as desired.

What I claim as my invention and desire to secure by Letters Patent is:—

1. A dynamo suspension link comprising two portions adjustable in relation to one another in such manner as to vary the relative positions of the ends of the limbs for the purpose of sluing the spindle of the dynamo which is supported in such ends, substantially as described.

2. Dynamo suspension link comprising two link portions, and connecting means adapted to normally hold the two portions in fixed relationship but when loosened to allow of one portion being adjusted relatively with the other portion, substantially as set forth.

3. Dynamo suspension link comprising two link portions, connecting means adapted to normally hold the two portions in fixed relationship, and adjusting means mounted on one portion and operative against the other portion to alter the said relationship when such connecting means are loosened, substantially as set forth.

4. Dynamo suspension link comprising two link portions, bolts connecting said portions together one of said portions having enlarged bolt holes or slots to permit of relative motion between said portions when said bolts are loosened, lugs on one portion having ears overhanging the other portion, and set screws passing through screw threaded holes in said ears and engaging said other portion substantially as and for the purpose set forth.

5. Dynamo suspension link comprising a divided limb, bolts securing the portions of said divided limb together, a dynamo suspension pin mounted in the lower ends of the limbs of the link, a portion of the divided limb having enlarged holes for the reception of said bolts for the purpose of enabling such limb portions to be moved relatively with one another when said bolts are loosened substantially as and for the purpose set forth.

In testimony whereof I have signed my name to this specification in the presence of two subscribing witnesses.

ALFRED HENRY DARKER.

Witnesses:
HERBERT D. JAMESON,
H. N. PUMFREY.